June 25, 1968  J. PAVLECKA  3,389,617
IMPACT CUSHIONING STEERING MECHANISM
Filed Oct. 22, 1965  3 Sheets-Sheet 3
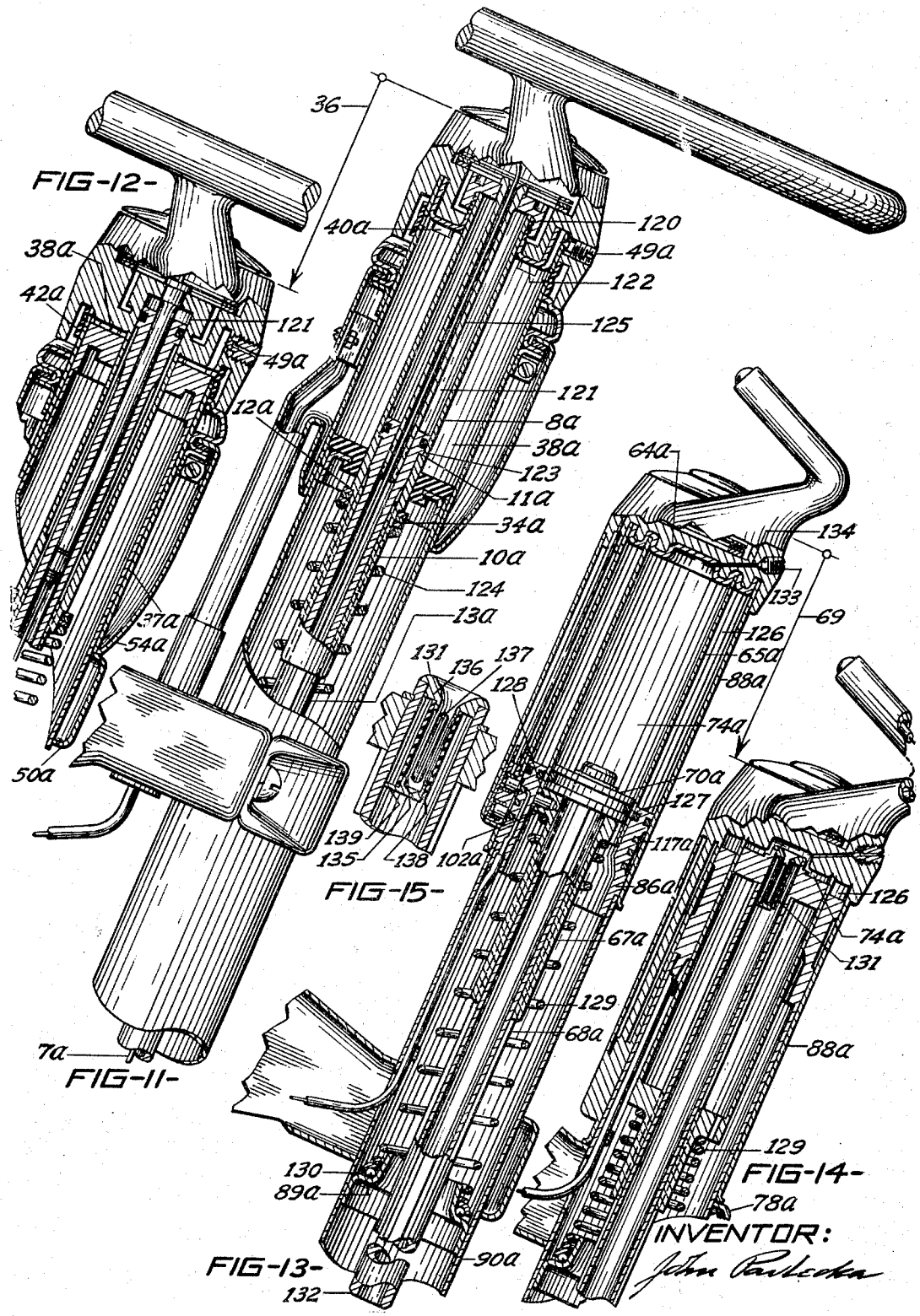

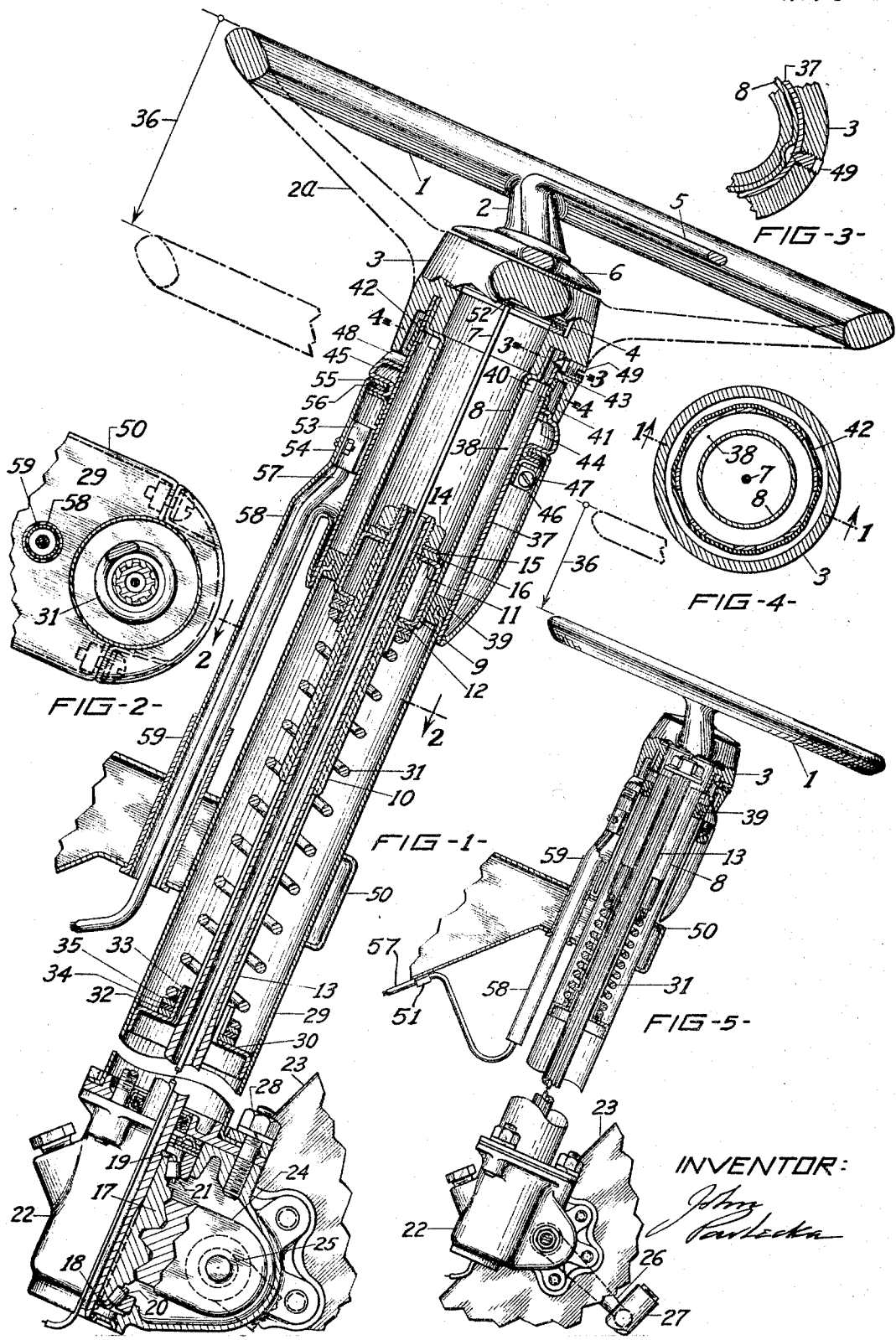

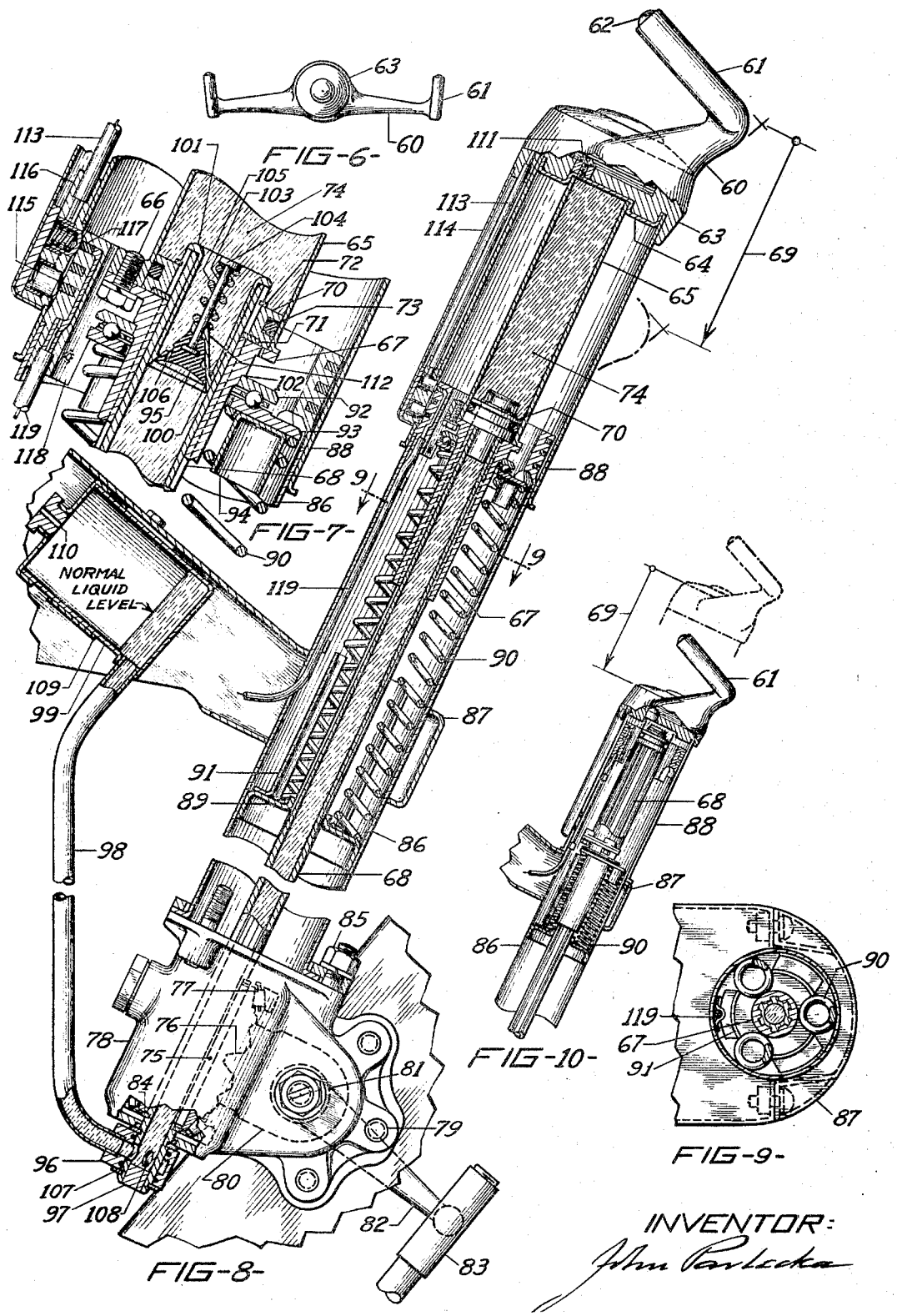

United States Patent Office 3,389,617
Patented June 25, 1968

3,389,617
IMPACT CUSHIONING STEERING MECHANISM
John Pavlecka, 8797 Capital, Oak Park, Mich. 48237
Filed Oct. 22, 1965, Ser. No. 501,478
35 Claims. (Cl. 74—492)

ABSTRACT OF THE DISCLOSURE

The subject vehicle steering mechanism cushions the driver's impact upon a descendable unit of the mechanism gradually, not by destroying the mechanism but by compressing a spring, or air in a cylinder and piston chamber, or both; another cylinder and piston chamber displaces a fluid—either air or a liquid—through a check valve by the impact, and the ensuing vacuum in the chamber arrests the descended unit against a dangerous rebound; for a slow ascent of the unit to its normal position by the stored impact energy, the fluid is bled restrictedly back into the chamber; alternate central and annular outer locations of the fluid-displacing and air-compressing chambers are optionally usable, and two embodiments of horn and turn signal control connections are provided between the turnable and descendable steering unit and the vehicle structure.

---

My present invention relates to a resiliently mounted vehicle steering wheel or handle bar for cushioning and absorbing an impact thereon by the driver due to a sudden stop of the vehicle, and which is prevented from rebounding forcibly into its normal position.

One object of this invention is a safety steering wheel or bar for vehicles of all types which is resiliently depressible against an increasing resistance of compressible and expansible means, such as a spring, or a spring and compressed air, if the driver is thrown upon it by a rapid deceleration of his vehicle, or if the steering mechanism is thrust against him by a deformation of the vehicle frame or structure in an accident.

Another object is a safety steering mechanism for vehicles that does not absorb energy by collapsing its shape and crushing its material and thereby becoming useless, as the currently employed type does, but instead uses a resiliently compressible and expansible energy absorbing means so that it does not have to be replaced at considerable cost even after a minor impact thereon, and is restorable to its normal position and use readily and safely.

Another object is a telescopically mounted steering wheel or handle bar, as a vital improvement over the type now in common use, in that a minimal force of a resiliently compressible and expansible means holds the telescoping parts extended, and the resisting force of that means increases with the telescoped ditsance up to a maximum at its end; thus, a frontal impact by the driver, or a rearward thrust of the steering shaft against him, are met by a nominal initial resistance that does not cause a shock to the driver, and his momentum thereafter is decelerated gradually to a stop in as long a distance as practicable.

Another object is a steering wheel or handle bar for vehicles which is yieldably depressible under an impact by the driver against resiliently compressible and expansible means, such as a spring or spring alone or in conjunction with an air cylinder, and after absorbing the driver's momentum the compressed means is prevented from driving the wheel or bar violently into its normal position.

Another object is a steering wheel or bar mechanism in which the wheel or bar is held in its normal position by a pre-compression of a cushioning means, and is depressed by an impact thereon against an increasing compression of said means, and a fluid chamber with a piston therein is provided the fluid from which is expelled by the descent of the wheel or bar, and the instant it ceases reentry of the fluid into the chamber is shut off, the wheel or bar thus being restrained by a vacuum in the chamber from rebounding into its normal position by recoil of the compressed cushioning means.

Another object is a means in the above outlined mechanism for restricted manual or automatic re-admission of the fluid in the evacuated chamber for releasing the compressed means and the wheel or bar into the normal position thereof slowly and safely.

Yet another object is to provide means in the above steering mechanism for electrical horn and turn signal connections between the rotatable and telescopic unit of the mechanism and the stationary part of it.

The mechanism affording the above objective is disclosed hereinfurther first by a description of its essential components, their relationships and functions, and then in relation to two embodiments thereof as well as to a variant of each of the embodiments in which compressed air additionally to a spring or springs is made use of for energy absorption.

The steering wheel and its supporting column and hub thereon in automobiles and other vehicles are the cause of many injuries and deaths in accidents involving sudden stops, such as in head-on collisions; in such cases the steering wheel collapses by the impact of the driver upon it and the driver strikes the hub on the column end; the concepts combined in this invention are (1) to provide means for resiliently cushioning the driver's impact upon the steering wheel or steering bar in as long a distance as practicable, (2) to provide means for arresting or retarding the depressed wheel or bar from being thrown forcibly back into its normal position and thus possibly causing injury to the driver and (3), to release the depressed steering wheel or handle bar slowly and safely to its normal extended position.

A steering mechanism embodying the above concepts includes a conventional steering reduction gearing and linkage between it and the vehicle wheels for directional control, the gearing being operated either directly by a steering wheel or a handle bar, or through a power device, by means of a steering shaft which extends from the gearing or the power device towards the steering wheel or bar and terminates at a distance from it; in a splined or keyed engagement with the steering shaft at its upper extremity, and abutting a stop, such as a nut and washer thereon, is a sleeve member which functions as an angularly positive but lengthwise slidable coupling of the steering wheel or bar unit with the steering shaft by means of a lower portion of a substantial length for stability of the extended unit, while an upper tubular portion mounts the wheel or bar and accommodates the end of the steering shaft and the nut thereon in its travel downwards, or in the shaft's thrust upwards; the unit is held in its normal position with a certain initial force by a spring or springs which bear, at their upper end, against the steering wheel or bar unit at a shoulder located well up on the sleeve member at or near its tubular portion, and at the lower end bear against a fixed seat provided in the usual tubular post or column around the steering shaft, the post being held stationary on the steering gear housing, or by a bracket on the vehicle structure, or by both; in view of the fact that the upper end of the spring or springs bears against a shoulder which turns with the steering wheel or bar, an anti-friction bearing is provided at either end of the spring or springs, and preferably at both ends if the bearing is a thrust washer. The spring or springs are under an initial compression sufficient to hold the steering wheel or bar unit firmly against minor impacts, such compression being applied to the spring or springs by the aforementioned nut or other retaining means at the end of the steering shaft.

The spring or springs are of the required length and rate for any desired maximum compression in the predetermined distance of travel of the steering wheel or bar unit; this travel should be as long as practicable for greater safety because the longer it is the more gradual and with less shock initially and terminally will be the deceleration of the forward momentum of the driver; the total travel available will be controlled by a jacket forming a part of the steering wheel or bar unit at its hub and having its lower edge spaced apart from the aforementioned supporting bracket by the distance of travel so that the bracket acts as a stop for the steering wheel or bar telescoping unit when its jacket hits the bracket.

The foregoing mechanism and its function implement the first part of the overall concept of the subject invention, i.e. the telescopically mounted steering wheel or steering bar with a substantial spring-cushioned travel; for implementing the second part, i.e., for preventing a violent rebound of the steering wheel or bar from its depressed position, a fluid displacing chamber is provided, in one embodiment, by the aforementioned cylindrical packet around the central steering wheel or bar supporting sleeve member; an annular piston is held fixedly on the end of the aforementioned stationary tubular post inside the jacket and apart from the steering wheel or bar hub; in another embodiment, the central sleeve member itself functions as a fluid displacing chamber by being closed off at the hub, and a piston is provided therein on the extremity of the steering shaft; in either embodiment a port or ports are provided in the chamber through which the fluid, such as air or a liquid, is displaced when the steering wheel or bar unit is descending under an impact thereon, or when the steering shaft and the post are ascending, driven by a rearward impact on their supporting structure; a check valve is installed in or over the port or ports which allows free escape of the fluid but closes the port or ports the instant the steering wheel or bar unit comes to a stop against the resistance of the spring or springs, whether it be at the full down stroke or at any portion of it; a vacuum is created in the chamber of a magnitude such as to overcome the force of the spring or springs and thus hold the steering wheel or bar unit at or near its depressed position.

For implementing the function of releasing the steering wheel or bar unit from its arrested depressed position gradually and safely, a means is provided to re-admit the fluid into the chamber at a slow controlled rate; by so controlling the release of the compressed spring or springs, any danger of the unit being returned with the same shock as caused its descent is eliminated; the fluid reentry control may be either manual by means of a valve, or automatic by means of a restrictive orifice.

Carried on or in the proximity of every steering wheel or bar are horn and turn signal controls; for the subject wheel or bar which executes an axial movement besides the turning one, two species of electrical connections for these controls will be disclosed; in one, a tubular guide which carries a turn signal switch and a cable from it to the vehicle structure, and which passes downwardly through a pilot in a stationary bracket and is constrained against turning while being free to move downwardly with the steering wheel or bar.

The other species of electrical connections for the turning and telescoping steering wheel or bar resides in stationary collector rings and spring-loaded contacts in registry therewith, and wires leading to the rings and others from the contacts to the horn and turn signal controls; under an impact upon the wheel or bar the contacts slide downwardly out of registry with the rings and over the steering gear post.

The above disclosed constructions lend themselves to modifications of which two variants in the matter of either a central or an annular fluid displacing chamber have already been referred to, as have two alternative arrangements of electrical connections for horn and turn signal controls; the two disclosed variant embodiments can each be further modified by employing compressed air for augmenting the energy absorbing capacity of the disclosed spring or springs, to the degree that the air may absorb most of the energy and a spring may perform mainly the function of holding the steering wheel or handle bar unit in its normal extended position by an initial light resisting force; this is accomplished in the first above disclosed embodiment, with the annular fluid displacing chamber around the central sleeve member, by closing off the sleeve member at its upper end beyond the stroke of the steering shaft and providing a piston on the end of that shaft in the sleeve; in the other disclosed embodiment, with the sleeve member forming a fluid displacing chamber inside of it, the aforementioned cylindrical jacket around it is converted to compressing air by a piston as a part of the electrical collector ring molding therein, which molding is carried on the end of the aforementioned stationary tubular post.

The above introduced parts and their relationships for the stated novel and useful results are illustrated in two embodiments and a modified construction of each one in the drawings, in which:

FIG. 1 is a cross-sectional elevation through a steering mechanism in which the wheel unit has a telescopic movement cushioned by a spring, an air chamber with ports and a check valve thereon being provided for restraining the wheel from a rebound after an impact thereon, and an angularly fixed but axially movable turn switch housing being carried on the turning and telescoping steering wheel unit.

FIG. 2 is a transverse section taken in FIG. 1 at a location and in a direction designated 2—2 therein.

FIG. 3 is a transverse section showing a needle valve for refilling the air chamber in the mechanism of FIG. 1, taken in a plane 3—3 therein.

FIG. 4 is a transverse section through an air check valve taken in a plane marked 4—4 in FIG. 1.

FIG. 5 is a sectional side view of the mechanism of FIG. 1, on a reduced scale, with the steering wheel unit in a fully depressed position after an impact thereon.

FIG. 6 is a plan view of the steering handle bar shown in side view on the mechanism in FIG. 8.

FIG. 7 is a longitudinal cross-section, on an enlarged scale, through a portion of the mechanism of FIG. 8, and showing a fluid check valve, a ball thrust bearing for buffer springs, and collector rings and contacts slidable thereon for horn and turn signal control connections.

FIG. 8 is a longitudinal sectional view through a telescopic steering mechanism embodying the handle bar of FIG. 6, the check valve, ball thrust bearing and collector rings of FIG. 7, and employing a surge tank for a liquid displaced by the handle bar unit during an impact thereon.

FIG. 9 is a transverse cross-section through the post, springs and steering shaft in the mechanism of FIG. 8, taken in the location and in the direction designated 9—9 therein.

FIG. 10 is a side elevation, partly sectionalized, of the mechanism of FIG. 8, reduced in size, with the handle bar unit in a fully depressed position after an impact on it.

FIG. 11 is a longitudinal sectional view of a modified construction of the embodiment of FIG. 1 in that a piston is added to the steering shaft for compressing air in the central sleeve member, closed at the top, for absorbing impact energy in cooperation with a preloaded spring.

FIG. 12 is a like view of the same mechanism as in FIG. 11 with the steering wheel unit descended to the lower limit under an impact thereon; the individual parts of the wheel unit are shown diagrammatically as a single body in order to make clear the final relationship of the pistons to the respective air displacing and compressing cylinders.

FIG. 13 is a sectional elevation of a modified construction of the embodiment of FIG. 8 in that a piston is added to the electrical collector ring molding for compressing air in the annular chamber between the central sleeve member and a cylindrical enveloping jacket for absorption of a part of impact energy in cooperation with a spring; the central vacuum-creating chamber in this embodiment displaces air instead of a liquid as in FIG. 8.

FIG. 14 is a cross-sectional view of the mechanism of FIG. 13 in the fully telescoped position of its steering bar unit, which is shown diagrammatically as a unitary body in relation to the pistons, also shown in outline only, in the respective vacuum and pressure cylinders.

FIG. 15 is a cross-section through the check valve in the embodiment of FIG. 14, shown in a larger size.

In the embodiment of FIG. 1 a steering wheel 1 is carried on spokes 2 by a hub 3; the spokes, normally crosswise of the driver, are shown by dot-and-dash lines in full profile; the hub contains a recess 4 in which the usual horn switch mechanism is actuated by an external half-ring 5 carried by arms on a spring-sustained cover 6 over the hub; a wire 7 energizes a relay when the ring 5 and cover 6 are depressed and contact made for sounding a horn.

Imbedded fixedly in the hub 3 is a sleeve member 8 in which distantly from the hub is brazed a spacer 9 which, in turn, is brazed to a sleeve extension 10; the upper end of this extension is flush with the spacer inner face 11 while the spacer's outer face 12 forms a shoulder around the sleeve; this sleeve is in a splined or serrated engagement with a steering shaft 13 for turning it and for a lengthwise slidable travel on it; for gaining stability for the steering wheel and the sleeve member on the shaft 13, the sleeve extension 10 projects for a substantial distance beyond the shoulder 12.

The upper end of the shaft 13 is threaded and a nut 14, secured by a lock plate 15, retains a washer 16 against which the face 11 on the steering wheel unit abuts in its normal position; the lower extremity of the shaft operates a reduction gearing which may be of any one of conventional types, or it may operate such gearing by means of a power steering device of which different types are used on various vehicles. An exemplary gearing consists of a spiral worm 17 mounted by splines on the shaft and, in turn, retaining it axially between snap rings 18 and 19 by virtue of being carried on bearings 20 and 21 in a housing 22 which is bolted to the vehicle frame 23; the worm meshes with a toothed segment 24 on a cross-shaft 25, on which pitman arm 26 is ball-jointed to a drag link 27 (FIG. 5); this arm operates a linkage of rods for swiveling the vehicle wheels.

Secured by studs and nuts 28 to the housing 22 is a tubular post 29, concentric with the shaft 13, whose other end extends a short distance beyond the telescoping sleeve shoulder 12; attached fixedly to the inner wall of the post is a seat 30, and between it and the shoulder 12 is included a spring 31 which sustains, by an initial compression, the whole steering wheel telescoping unit in its normal position against minor impacts thereon. Even though the initial spring force between the stationary seat 30 and the turning shoulder 12 is small, anti-friction bearings are provided thereat, and consist—identically at both ends—of a thrust washer 32 with an inner lug on it fitted into a slotted hub 33 of the respective seat 30 and spacer 9, a bearing plate 34 of a low friction material, such as graphite or oil-impregnated sintered bronze, and another thrust washer 35 against which the spring 31 bears.

Besides performing the function of steering a vehicle, the foregoing mechanism additionally serves to cushion the momentum of an impacting driver upon the steering wheel by compressing the spring 31 to any portion or all of the downward stroke 36 of the wheel. The mechanism described hereinfurther serves the vital function of preventing recoil of the spring and of the steering wheel after an impact thereon; it includes a jacket 37 imbedded at one end in the steering wheel hub 3, and fitted slidably over the post 29 at the lower end, whereby an annular chamber 38 is created between it and the sleeve 8; on the end of the post 29 is carried a piston 39 in the form of a ring of a self-lubricating material; in the cylinder wall within the hub 3 is a number of peripherally spaced ports 40; a recess 41 larger than the cylinder is formed in the hub around and astride these ports, and in it is enclosed a band 42 of an elastic material which overlaps the ports on both sides and keeps them normally closed by its distended girth; in order to maintain the band's overlap of the ports, a number of projections 43 in the hub recess locate the band's upper edge, and similar projections 44 at its lower edge are part of a collar 45 held fixedly around the jacket 37 under the hub 3 by a clamp 46 and its tightening screw 47; alternating with the projections 44 around the collar are depressions 48 as vents for the ports 40 and recess 41 leading into the atmosphere.

Embodied above the hub recess 41 in one projection 43 is a needle valve for slow admission of air into the chamber 38; it consists of a needle 49 threaded into the hub 3 and having its point seated in the wall of the jacket 37; back of this wall a passage formed by a fold in the wall of the sleeve 8 (FIGS. 1 and 3) communicates with the chamber 38.

The above disclosed mechanism cushions impacts and prevents a rebound therefrom in the following manner: In a rapid deceleration or a sudden stop of the vehicle the driver's impact upon the steering wheel, or its advance towards him due to a deformation of the vehicle structure, causes the steering wheel and hub 1–2–3, jacket 37, collar 45, sleeves and spacer 8–9–10, and the bearing at the spring upper end, to descend by virtue of the slidable splined engagement of the sleeve 10 with the steering shaft 13 while the impact energy is being absorbed by an increasing compression of the spring 31, acted upon by the upper thrust bearing and reacted against by the identical bearing 32–34–35 on the stationary seat 30. The length of the descent 36 at its maximum is limited by the lower end of the jacket 37 hitting a bracket 50 which holds the post 29 rigidly from the vehicle frame or body; this extreme position of the steering wheel unit is shown in FIG. 5; in the descent of the steering wheel unit into this position, or any shorter one, the stationary piston 39 is compressing the air in the chamber 38 up to an early instant when the tightness of the band 42 is overcome by the air pressure upon it and the air is released through the ports 40, recess 41 and vents 48.

Upon the completion of a downward stroke of the steering wheel unit the spring 31 would normally recoil and hurl the unit upwards with the same momentum which it just absorbed; this recoiling movement is arrested the instant it starts by the band 42 which contracts and closes the ports 40, thereby shutting off reentry of the air into the chamber 38; the vacuum thus created in the chamber by the least motion of the steering wheel unit upwardly will hold it at or close to the end of its downward stroke; to this end, the area of the piston 39 is such that when multiplied by the atmospheric air pressure the holding suction in the evacuated chamber will be greater than the maximum compression of the spring 31 in the distance 36.

The steering wheel and the telescopic mechanism integral with it will be held in a depressed position until the vacuum in the chamber 38 is broken; this is accomplished without any danger to a person by loosening up the needle valve 49 with a screw driver, or a coin, and letting air slowly into the chamber.

The above disclosed steering mechanism carries the usual horn and turn signal controls, and their downward movement is accommodated, in the case of the horn control, by the wire 7 which extends, as in some conventional devices, through the hollow steering gear shaft 13 and sleeve 8 and connects to a contact-marking ring 52 inside the hub 3; the wire adapts itself to the turning of the steering wheel by twisting and to the telescopic movement of the wheel by coiling up in the hub or by sliding out of the open end of the shaft 13. The turn signal control employs a conventional switch 53, which is actuated by the usual lever on the near side of the sectional FIGS. 1 and 5 and, therefore, not visible in these figures; the switch and the lever are mounted on a split housing 54 which is suspended around the jacket 37 by a flange 55 fitted into a radial groove in the collar 45 over a thrust washer 56; while thus being independent of the turning of the steering wheel unit and the jacket 37 as one of its parts, the housing and the control therein perform the telescopic movement together with the unit; in order to be able to do this, and in order to accommodate wires 57 leading to the switch from a stationary part of the vehicle and held thereto by a clip 51, a downwardly directed tubular conduit 58 is made integral with the housing 54; it passes through a pilot bushing 59 held in the bracket 50 and is guided thereby axially while being constrained with the housing against turning with the steering wheel unit.

Besides the foregoing air-displacing mechanism for the detention of the depressed steering wheel unit by vacuum, the fluid in the holding chamber can be a non-congealing liquid, such as oil, brake fluid, or an anti-freeze fluid; a steering mechanism devised for use of either such a fluid or air is shown in FIGS. 6–10. A steering bar 60 is shown as an alternative of a wheel, and has handles 61 on it with buttons 62 for turn signals in them; the bar has a hub 63, and imbedded in it is a header 64, one integral part of which is a sleeve member 65, flanged remotely from the hub; secured to its flange by bolts 66 (FIG. 7) is an extension sleeve 67 which is of substantial length to provide a stable yet a slidable engagement by splines with a steering gear shaft 68; the upper end of the sleeve 67 forms a shoulder inside the sleeve 65, and the shaft 68 projects therebeyond a collar 70 is held on it between a split washer 71 and a snap ring 72; the collar, besides functioning as a stop for the sleeve 67 and the whole steering bar unit, functions also as a piston in the sleeve 65 and carries an O-ring 73 against the sleeve wall; a fluid chamber 74 is thus formed by the sleeve, the piston, and the header 64.

At its other extremity the shaft 68 is keyed at 75 to a helical worm 76 mounted on bearings 77 in a housing 78, attached by bolts 79 to the vehicle frame or structure; meshing with the worm is a toothed segment 80 on a shaft 81 on which pitman arm 82 and a drag link 83 steer the vehicle wheels through a suitable linkage; the shaft 68 is affixed axially to the worm 76 by snap rings 84, and its lower end projects from the housing 78 for a function described presently; the worm-and-segment reduction gearing is one of a number of different types which can be used, including power steering devices operating in response to the steering shaft.

Secured to the housing 78 by studs and nuts 85 is a post 86 which is supported from the vehicle structure by a bracket 87, and beyond it rises for a distance greater than the intended maximal downward travel 69 of the steering bar unit under an impact; this unit includes additionally a jacket 88 which is integral with the header 64 in the hub 63 and fits slidably over the post 86; its end is at a distance from the bracket 87 equal to the maximum travel 69 of the steering bar unit and thus provides a stop for it, as shown in FIG. 10.

A seat 89 is attached to the inside of the post 86, and bearing against it by one end and against the sliding sleeve 67 by the other is one or more of springs 90, three being shown by way of an example; affixed to the seat between the springs are spacing and guiding baffles 91 (FIGS. 8 and 9); the sleeve 67 has a shoulder 102 on it against which abuts one raceway plate 92 of a ball or roller thrust bearing, the other plate 93 of which seats the springs around locating cups 94. The springs are assembled in place with a relatively small preloading compression to hold the steering bar unit firmly under normal driving conditions.

The above disclosed parts constitute the mechanism for steering a vehicle as well as for providing a spring cushioned telescopic steering bar unit as a safety device in accidents. Certain of the disclosed parts, in combination with others disclosed herebelow, perform the equally critical function of checking the rebound of the depressed springs and steering bar unit, and effecting a slow and safe release thereof; this purpose is served by the fluid chamber 74 from which the fluid is displaced as the cylinder 65 descends past the stationary piston 70; the fluid is discharged into the hollow steering shaft 68 through a check valve 95, through the shaft and a collector fitting 96 on its lower end, closed by a plug 97, and through a tube 98 into a surge tank 99 of a volume greater than that of the chamber 74. The check valve is contained in a thimble 101 pressed into the shaft (FIG. 7) and having a conical seat 100 at its inward edge from which one or more ribs support centrally a hub 112; movable slidably in this hub is a stem 103 with a head 104 on one end and the valve 95 on the other, the latter being of a resilient material; a spring 105 on the stem urges the valve against the seat 100; a small orifice 106 through the valve bypasses the seat and connects with a groove ahead of it.

At the other shaft end, the collector fitting 96 is fixed axially between two snap rings 107 and is held stationarily on the shaft by the tube 98; a groove in the fitting encompasses a number of openings 108 in the shaft and has an outlet to which the tube is connected. The tank 99 is attached to the vehicle structure by a strap 109 at a location above the chamber 74, and is filler plug has a vent 110 in it. At the other end of this hydraulic system, a boss on the header 64 in the steering bar hub 63 at the highest point of the chamber 74 has a plug 111 threaded into it.

When the sleeve 65 descends under an impact upon the steering bar down to any portion or all of its full stroke 69—the latter condition being shown in FIG. 10—the fluid in the chamber unseats the valve 95 and is discharged through the collector fitting 96 and tube 98 into the tank 99; the instant the springs 90 retard the steering bar unit to a stop, the valve 95 becomes seated by the spring 105, thereby shutting off reentry of the fluid into the chamber 74; any movement of the steering bar unit and sleeve 65 upwards due to the recoil of the springs 90 is resisted by the vacuum created in the chamber, the holding force of which vacuum is greater than the maximum recoiling force of the springs; the steering bar unit will thus be arrested at its full downward stroke or at any part of it. A trickle of the fluid through the orifice 106 will slowly refill the chamber with the fluid from the tank 99 and by thus releasing the energy of the springs at a slow rate will allow the steering bar unit to rise gradually to its normal position.

Filling up the chamber 74 with the liquid initially is done by unscrewing the plug 111 and bleeding the air therefrom as the fluid flows in through the orifice 106 by gravity from the higher located tank. Air can also be used in the above disclosed mechanism instead of the liquid, and the collector fitting and the tank can be dispersed with; the advantage of the liquid is in that it will restrain the steering bar unit from rebounding the instant its downward motion ceases because there is no residual air in the chamber 74 to expand and thus allow the unit to rise a small distance from its arrested position.

For horn and turn signal controls, wires 113 are plugged into sockets in the hub 63 and extend along the jacket 88 inside a cover 114 to spring-loaded contacts 115 in a terminal block 116 attached to the jacket near its end (FIG. 7); opposite each contact is a stationary collector ring 117 among a number of them in a molding 118 mounted inside the post 86 inbetween the springs 90 therein and carrying the rings above its edge on a diameter somewhat smaller than that of the jacket 88; from the collector, rings wires 119 lead downwardly through the post and exit from it through an opening as a stationary part of the electrical system of the vehicle.

Wires 113 and the terminal block 116 turn together with the jacket 88 as components of the steering bar unit, and in its descent upon an impact on it contacts 115 slide over the surface of the post 86, and ultimately are returned into registry with the collector rings.

The spring or springs employed in the above embodiments as resiliently compressible and expansible energy absorbing means can be supplemented or replaced by other such means, such as rubber; a suitable element for taking over from a part the function of the spring or springs is air contained in a pneumatic sealed cylinder and compressed by a piston therein; such a cylinder may be formed in the mechanism supporting post, or it may be located above it by utilizing the space or chamber either inside or outside the fluid displacing valved chamber in the respective embodiments of FIGS. 1 and 8; their modified constructions for that purpose are shown in FIGS. 11 and 13.

The construction in FIG. 11 employs all the essential parts of that in FIG. 1, and additionally a cap 120 is threaded onto the central sleeve member 8a to close it off and make it function as an imperforate air chamber 121; similarly, a bulkhead 122 closes the air-displacing chamber 38a therearound; the extremity of the steering shaft 13a is enlarged to form a piston 123, sealed by an O-ring, in the chamber 121; the piston provides a downwardly facing shoulder 11a against which the sleeve member 8a abuts with an upturned shoulder as a limit stop for the whole steering wheel or handle bar unit in its fully ascended position.

The sleeve member 8a has a lower portion or extension 10a which is in a splined or otherwise angularly positive and axially slidable engagement with the steering shaft 13a for a substantial distance equal to several times its diameter for imparting stability to the steering wheel or bar unit in its extended position.

A coil spring 124, analogous to the spring 31 in FIG. 1, is confined between a lower and an upper thrust bearing 34a, and exerts a preloading force through latter bearing against a shoulder 12a high up on the sleeve extenstion 10a; the primary function of the spring 124 being to offer a minimal initial resistance to an impact upon the steering wheel or handle bar, or upon the steering shaft from the opposite end, it can be of a low rate and light weight even though its resistance builds up when being compressed and thereby cooperates with the air in the chamber 121 in absorbing impact energy.

For conveying and guiding the horn wire 7a through the chamber 121 and piston 123 in an air-tight manner, a tube 125 is pressed into the cap 120, and telescopes slidably into the hollow shaft 13a during a relative movement of the two.

In the fully descended position of the steering unit of FIG. 11, as shown in FIG. 12, when the jacket 37a and the housing 54a hit the supporting bracket 50a, the chamber 121 and the compressed air therein have been reduced to a minimum volume; in the surrounding chamber 38a almost all of the air has been expelled through the ports 40a (FIG. 11) and check valve 42a, and a rebound of the descended steering unit is prevented by vacuum created in the clearance space to which the volume of the chamber has been reduced; only bleeding of air into the chamber by the needle valve 49a will release the unit back into its normal ascended position.

A modifiaction of the embodiment of FIG. 8 for absorbing impact energy by compressed air is shown in FIG. 13, for which purpose the annular chamber 126 between the central sleeve member 65a and the imperforate jacket 88a is used, closed by a header 64a; a piston 127, carried axially fixedly on the tubular post 90a, is provided in the lower open end of the chamber 126 by the molding 86a above the collector ring 117a therein.

The sleeve member 65a forms a unitary assembly with its lower extension 67a, which engages the steering shaft 68a angularly but axially slidably thereon; the sleeve assembly is effected by a number of dowels 128; the piston 70a on the steering shaft 68a is abutted by the end face of the sleeve extension 67a and thus provides the upper limit stop for the whole steering unit which is urged upwardly by a spring 129; this spring is confined between a ball bearing 130, supported on a seat 89a inside the post 90a, and a down-turned shoulder 102a located on the extension 67a distantly from its end.

During the descent of the steering unit under an impact, the piston 70a displaces the fluid—air in this instance by way of an example—from the chamber 74a into the hollow shaft 68a, through a check valve 131 (FIG. 14) therein, and through the shaft open end 132 into the atmosphere. In the extreme down position in FIG. 14, when the jacket 88a bottoms on the supporting bracket 78a, the chamber volume 74a is at its minimum; vacuum created therein in that position or only a partially descended one by the expansive force of the spring 129 and of the air compressed in the chamber 126 will hold the steering unit close to the position reached by it and prevents its rebound. A metering valve 133 (FIG. 13) can be opened to bleed air through a passage 134 into the chamber 74a for allowing the steering unit to rise gradually to its normal ascended position.

The air-releasing check valve 131 in the steering shaft extremity (FIGS. 14 and 15) is of the same type and construction as the exteriorly located valve 42 in FIGS. 1 and 4, and 42a in FIG. 12, only the proportions are changed; it comprises a sleeve 135 carried on a flanged boss 136 inside the shaft; the sleeve has one open end into the chamber 74a and the other end closed, and forms a part of the chamber wall; it is perforated by a number of ports 137, and around it and the ports is a band 138 of elastic material, which corresponds to the larger band 42 in FIGS. 1 and 4, and is prevented from slipping off by at least one projection 139. Air under pressure in the chamber 74a will dilate the band 138 and escape from under it through the shaft 68a.

The above disclosed embodiments may be further modified by a substitution of equivalent parts, relationships and functions, such as, for instance, by employing rubber instead of coil spring or springs, using different check valve types, and resorting to a different fabrication, division and manner of assembly of the various parts, all of which modifications are in purview of the following claims.

I claim:

1. In a vehicle steering mechanism, a steering shaft, a hub and means for manually turning the same thereon at a distance from one shaft end and coaxial therewith, means for mounting said hub angularly positively and lengthwise slidably on said shaft, said shaft having a down-turned face at said end thereof, a spring urging said shaft-mounted means against said shaft face for holding said hub and turning means in the normal position thereof, a sleeve forming a part of said shaft-mounted means at and around said shaft end and extending to said hub and being joined thereto and closed thereat, said sleeve forming a central fluid chamber, a piston on said shaft end in said sleeve and chamber, a jacket joined at a closed end to said hub and extending coaxially with said sleeve and forming an annular fluid chamber jointly therewith, a stationary post mounted around said shaft and said shaft-mounted slidable means, a piston carried on said post in said annular chamber, one of the two chambers being sealed and filled with air, at least one port in the other chamber, a check valve opening said port for discharge of the fluid displaced by a lengthwise movement of said chamber past the piston therein due to an impact upon said manual turning means, and means for reentry of the fluid into said chamber at a restricted rate for gradually releasing said shaft-mounted means, said chambers and said hub and turning means from a depressed position after an impact thereon into the normal position thereof.

2. In a vehicle steering mechanism as set forth in claim 1, said central fluid chamber being the sealed one, a number of ports in said annular chamber at said hub, said check valve being located exteriorly at said ports, a passage from the exterior into said chamber beyond the full stroke of said piston therein, and a valve in said passage for said restricted reentry of the fluid into said chamber.

3. In a vehicle steering mechanism as set forth in claim 1, said annular chamber being the sealed one, said steering shaft being hollow and forming said discharge port from said central chamber, said check valve being located in said shaft, and an orifice in said valve for said restricted reentry of the fluid into said central chamber.

4. In a vehicle steering mechanism, an axially fixed turnable steering shaft having an upper extremity, a steering unit having an upper manually turnable portion above said shaft extremity and being integral with a lower portion angularly fixed and axially slidably descendable on said shaft, stop means on said shaft extremity and abutting stop means on said steering unit, a coil spring mounted axially fixedly at one end and bearing said steering unit on the other end in the ascended position against said shaft stop means, a turn signal control mounted on said steering unit upper portion, wires leading from said control to the vehicle electrical system, said wires including a length thereof carried by said turnable and descendable steering unit and a stationary length affixed to a part of the vehicle, and means for maintaining continuity between said turnable and descendable length and said stationary length of said wires in said ascended position of said steering unit.

5. In a vehicle steering mechanism as set forth in claim 4, a port supported fixedly around said steering shaft, a jacket forming a part of said steering unit upper portion and turnable and descendable over said post by like movements of said unit, a terminal block carried on said jacket, contacts contained in said block and therefrom projecting radially interiorly into said jacket, said turnable and descendable length of said wires extending on the exterior of said jacket and connecting to said contacts, collector rings carried by and beyond said post in registry with said contacts, and stationary wires leading from said rings through said post into the vehicle.

6. In a vehicle steering mechanism, a rotatable steering shaft having an upper extremity and having a down-turned stop means on said extremity, a steering unit comprising upper and lower integral portions and an upturned stop means between said portions and normally in abutment against said shaft stop means, the unit upper portion including manually turnable steering means at a distance from said stop means, the lower portion being in an angularly positive and axially slidable engagement with said shaft for a substantial length for maximal stability of said steering unit in the normally ascended position thereof against said shaft stop means, said steering unit having an external down-turned shoulder thereon, a resiliently compressible and expansible means having one end thereof mounted axially fixedly and having the other end exerting a force against said shoulder, said shoulder being located distantly from the end of said lower unit portion in the proximity of said upper portion for a substantial compressible length of said resilient means during the descent of said steering unit under an impact thereon.

7. In a vehicle steering mechanism, an axially fixedly held steering shaft having an upper extremity, a hub and manually turnable means therefor distanced from said shaft extremity, a sleeve member mounting said hub and extending downwardly to and past said extremity and therebeyond being in an angularly positive and axially slidably descendable engagement with said shaft, stop means on said shaft and abutting stop means on said sleeve member for limiting the ascent of said member to below said shaft extremity, a resiliently compressible and expansible means exerting an upward force against said sleeve member, means supported on the vehicle structure at a predetermined distance from said hub along said steering shaft, and a member integral with said hub along said sleeve member and having a lower end spaced apart from said vehicle-supported means for hitting the same at the limit of the descent of said hub and sleeve member on said steering shaft.

8. In a vehicle steering mechanism as set forth in claim 7, a stationary tubular post around said steering shaft having an end spaced apart from said hub, a bracket secured to said post as said vehicle-supported means, and a jacket around said sleeve member providing said member integral with said hub and having said lower end thereof fitted over and past said tubular post end.

9. In a vehicle steering mechanism, an axially fixedly held steering shaft having an upper extremity, a hub and manually turnable means therefor distanced from said shaft extremity, a sleeve member mounting said hub and extending downwardly to and past said shaft extremity and therebeyond being in an angularly positive and axially slidably descendable engagement with said shaft, stop means on said shaft and abutting stop means on said sleeve member for limiting the ascent of said member on said shaft, a down-turned shoulder on said sleeve member, a seat supported fixedly around said shaft below said sleeve member shoulder, a coil spring confined partially compressed between said sheet and said shoulder, and an anti-friction bearing included between at least one end of said spring and the respective one of said shoulder and seat between which said spring is confined.

10. In a vehicle steering mechanism, an axially fixedly held steering shaft having an upper extremity, a hub and manually turnable means therefor distanced from said shaft extremity, a sleeve member mounting said hub and being in an angularly positive and axially slidable engagement with said shaft for a descent thereon, a stop means on said shaft for limiting the ascent of said sleeve member to below said shaft extremity, a resiliently compressible and expansible means exerting an upward force against said sleeve member, a turn signal control means mounted in the proximity of said hub and executing said descent with said sleeve member and hub under an impact on said hub and turnable means, and means for constraining said turn signal control means against turning with said hub and sleeve.

11. In a vehicle steering mechanism as set forth in claim 10, a jacket forming a part of said hub around said sleeve member, a housing surrounding said jacket, said turn signal control means being carried in said housing, wires leading from said control means to the vehicle structure and being carried thereon, means for supporting said housing for executing said descent together with said jacket and being angularly free of said jacket, said constraining means holding said housing angularly fixedly to the vehicle structure, and means for conducting said wires from said angularly fixedly held and lengthwise descendable housing to said vehicle structure.

12. In a vehicle steering mechanism as set forth in claim 11, a bracket extending from the vehicle structure to said mechanism at a distance from the end of said jacket and said housing thereon, a tubular guide integral with said housing and directed alongside said steering shaft through said bracket, and a pilot in said bracket in unity therewith having a slidable fit with said guide, said guide conducting said wires from said turn signal control means to said vehicle structure and providing said means for constraining said housing and said turn signal control means thereon angularly while allowing a lengthwise descent therefor.

13. In a vehicle steering mechanism as set forth in claim 11, a collar under said hub, means securing said collar to said jacket, said collar having a radial groove therearound, and said housing having a flange fitted into said groove and free of the turning movements thereof and being engaged by said groove as said means for executing a descent with said jacket and hub while being held angularly fixedly by said constraining means.

14. In a vehicle steering mechanism, a turnable steering shaft having an upper extremity and a down-turned stop means thereon, a steering unit consisting of an upper portion and a manually turnable means therein at a distance from said shaft extremity and a lower portion in an angularly positive and axially downwardly slidable engagement with said shaft, said steering unit having an inner up-turned face abutting said shaft stop means and having an outer down-turned face proximate to said inner face, a resiliently compressible and expansible means having a lower axially fixedly supported end and having an upper end exerting a force against said steering unit outer face, a fluid chamber wall means secured to said unit upper portion below said manually turnable means thereof and extending downwardly coaxially with said shaft, a piston carried axially fixedly in said chamber at the lower end thereof, a valve means for releasing fluid from said chamber irreversibly during a descent of said steering unit under an impact thereon, and restrictive means for bleeding the fluid back into said chamber at a slow rate for a gradual ascent of said steering unit up against said shaft stop means.

15. In a vehicle steering mechanism as set forth in claim 14, said fluid chamber wall means residing in a cylinder connecting said steering unit upper portion with said lower portion, said piston being carried in said cylinder on said shaft extremity and providing said down-turned stop means thereon, said shaft being hollow, and said fluid valve means being located in said shaft extremity and releasing the fluid through said shaft outwardly.

16. In a vehicle steering mechanism as set forth in claim 15, a second cylinder secured to and closed at said steering unit below said manually turnable means thereof and having an open end around said unit lower portion and forming an annular air chamber jointly with said fluid chamber cylinder, a piston in said annular chamber at said open end, and a stationary tubular post carrying said piston thereon.

17. In a vehicle steering mechanism as set forth in claim 15, said fluid chamber wall means being filled with a liquid, a surge tank located on the vehicle structure above said chamber, means connecting said shaft with said tank for discharge of the liquid displaced by and from said chamber into said tank, and a restrictive orifice in said check valve for refilling said chamber with the liquid from said tank at a slow rate by the force of said resiliently expansible means.

18. In a vehicle steering mechanism as set forth in claim 17, said shaft having an opening therein beyond said resiliently compressible and expansible means therealong, said shaft-with-tank connecting means including an internally grooved collector fitting on said shaft over said opening, said fitting having an outlet from said groove, and a tube connected to said outlet and to said tank.

19. In a vehicle steering mechanism as set forth in claim 14, said fluid chamber wall means comprising a first cylinder and a second cylinder, said first cylinder connecting said steering unit upper portion with said lower portion, said second cylinder being secured to and having a closed end at said unit upper portion and having an open end around said unit lower portion and forming an annular fluid chamber jointly with said first cylinder, said fluid release valve means being located on and around said second cylinder at the upper end thereof, said piston in said chamber having an annular shape, and a stationary tubular post carrying said annular piston thereon.

20. In vehicle steering mechanism as set forth in claim 19, said first cylinder being closed at the upper end thereof and forming an air chamber, and a piston carried on said steering shaft extremity in the lower end of said cylinder and providing said down-turned stop means thereon.

21. In a vehicle steering mechanism as set forth in claim 19, said second cylinder having a number of ports peripherally at said closed end thereof, said fluid release valve means including a band of elastic material surrounding said second cylinder and ports therein in a distended condition and laterally overlapping said ports, and means for retaining said band centrally over said ports.

22. In a vehicle steering mechanism as set forth in claim 14, said fluid releasing valve means including a cylindrical wall as a part of said chamber-forming wall means and said piston therein, at least one port in said wall, an elastic band in a distended condition around said wall and port therein, and means for locating said band laterally over said port.

23. In a vehicle steering mechanism, a turnable steering shaft having an upper extremity and a down-turned face thereat, a steering unit comprising a lower portion in an angularly positive and axially downwardly slidable engagement with said shaft and an upper portion and manually turnable means thereon at a distance above said shaft extremity, said unit lower portion having the shaft-engaging length thereof equal to a number of cross-sizes thereof and having an inner up-turned shoulder abutting said shaft down-turned face and having an outer down-turned shoulder located remotely from the end thereof, a spring having one end mounted axially fixedly and having the other end exerting a force against said outer shoulder and holding said steering unit normally in the ascended position against said shaft down-turned face, a cylinder having one closed end, a piston in the other end of said cylinder, said cylinder and said piston being part one of an axially stationary element of said mechanism and the other one of said steering unit for subjecting a fluid in said cylinder to compression during a descent of said steering unit under an impact on said manually turnable means thereof.

24. In a vehicle steering mechanism as set forth in claim 23, means for arresting said steering unit in a descended position after an impact on said manually turnable means thereof, and means for releasing said descended unit into said ascended position thereof at a controlled rate.

25. In a vehicle steering mechanism, a turntable steering shaft having an upper extremity, a piston on said extremity, a hub and manually turnable means thereon at a distance from said extremity, an imperforate cylinder secured to and closed at said hub and therefrom reaching to said shaft extremity and containing said piston therein, an extension connected to said cylinder, said extension having an up-turned face abutting the underside of said piston and therebelow being in an angularly positive and axially slidably descendable engagement with said shaft and having a down-turned shoulder thereon, a resiliently compressible and expansible means having one end thereof mounted axially fixedly and the other end exerting a force against said shoulder and holding said extension, cylinder, hub and turnable means thereon in the ascended position against said piston underside and jointly with air compressed in said cylinder by an impact upon said turnable means returning the same from a descended position into said ascended one.

26. In a vehicle steering mechanism as set forth in claim 25, said shaft having an axial hole therethrough, a wire as a part of an electrical control circuit leading from said hub into and through said shaft, a tube secured to the end of said cylinder at said hub and projecting through said cylinder into said shaft hole and being slidably descendable therein, said wire being conveyed in said tube.

27. In a vehicle steering mechanism, a turnable steering shaft having an upper extremity and having a down-turned face at said extremity, a hub and a manually turnable means thereon at a distance from said extremity, a sleeve member secured to said hub and therefrom reaching to said extremity, an extension connected to said sleeve member, said extension having an up-turned face abutting said face on said shaft extremity and therebelow being in an angularly positive and axially slidably descendable engagement with said shaft and having an outer down-turned shoulder thereon, and a resiliently compressible and expansible means having one end thereof mounted axially fixedly and the other end exerting a force against said shoulder, a cylinder secured to and closed at said hub and having a lower open end around and beyond said sleeve member and jointly therewith forming an annular chamber, an annular piston at said open end in said chamber, and axially stationary means supporting said piston thereon, said resilient means holding said extension, sleeve member, cylinder, hub and manually turnable means thereon in the ascended position against said steering shaft face and jointly with air compressed in said chamber by an impact upon said turnable means returning the same from a descended position into said ascended one.

28. In a vehicle steering mechanism as set forth in claim 27, at least one electrical wire leading from said hub downwardly outside of said cylinder, a radial contact as a terminus of said wire carried slidably at said cylinder open end and projecting through the wall thereof, a peripheral collector ring inside said cylinder wall in registry with said contact, an annular member containing said ring and being mounted on said piston supporting means, said member having a portion above said collector ring providing said annular piston in said chamber.

29. In a vehicle steering mechanism, an axially fixed turnable steering shaft having an upper extremity, a steering unit including a manually turnable means at a distance above said shaft extremity and a sleeve therebelow in an angularly positive and descendably free engagement with said shaft, means yieldable under an impact holding said steerting unit in a normally ascended upwardly limited position on said shaft, a cylinder forming a part of said steering unit, coaxially with said shaft and having an upper closed end at said turnable means, and a piston slidable in said cylinder carried axially fixedly normally in the lower end thereof, said steering unit being descendable on said shaft under a severe impact into an immediate proximity of said cylinder closed end to said piston for displacing substantially all fluid from said cylinder irreversibly for a holding vacuum therein or for retaining the fluid therein and compressing the same for impact cushioning.

30. In a vehicle steering mechanism as set forth in claim 29, said cylinder extending between and connecting said steering unit sleeve and turnable means, and said piston therein being carried on said shaft extremity.

31. In a vehicle steering mechanism as set forth in claim 30, said steering shaft having a hole therethrough and forming a discharge passage from said cylinder, and a fluid-releasing check valve keeping said passage normally closed.

32. In a vehicle steering mechanism as set forth in claim 29, said cylinder having an open lower end, a sleeve extending centrally in said cylinder and connecting said steering unit shaft-engaging sleeve with said turnable means, said piston being annular between said sleeve and said cylinder, and a stationary tubular post around said steering shaft carrying said piston.

33. In a vehicle steering mechanism as set forth in claim 32, said cylinder having at least one discharge port at said upper end thereof, and a fluid-releasing check valve keeping said at least one port normally closed.

34. In a vehicle steering mechanism as set forth in claim 29, said cylinder extending between and connecting said steering unit sleeve centrally with said turnable means, said piston being carried on said steering shaft extremity, an outer cylinder forming a part of said steering unit around said central cylinder and having a closed upper end at said turnable means and an open lower end, an annular piston slidable between both cylinders, a stationary tubular post around said steering shaft carrying said annular piston normally in said cylinder open end, a member of said mechanism having a discharge port therethrough in communication with the minimal volume space of one of said cylinders, a fluid-releasing check valve on said member keeping said port normally closed, and a restrictive means for bleeding the fluid back into said one cylinder for a slow ascent of said steering unit from a descended position thereof.

35. In a vehicle steering mechanism as set forth in claim 34, said discharge port member having a cylindrical wall, said check valve including an elastic partially dilated band around said wall and port therein, and means keeping said band normally overlapping said port laterally.

References Cited
UNITED STATES PATENTS

| | | | |
|---|---|---|---|
| 2,511,165 | 6/1950 | Lyman | 74—493 |
| 2,852,956 | 9/1958 | May | 74—492 X |
| 2,929,263 | 3/1960 | Felts | 74—493 |

MILTON KAUFMAN, *Primary Examiner.*

UNITED STATES PATENT OFFICE
CERTIFICATE OF CORRECTION

Patent No. 3,389,617                                                       June 25, 1968

John Pavlecka

It is certified that error appears in the above identified patent and that said Letters Patent are hereby corrected as shown below:

Column 1, line 53, "ditsance" should read -- distance --; line 62, "spring", second occurrence, should read -- springs --. Column 2, line 14, "objective" should read -- objectives --. Column 3, line 23, "packet" should read -- jacket --. Column 6, line 71, "the" should read -- a --; line 73, "marking" should read -- making --. Column 7, line 46, "pitman" should read -- Pitman --; line 69, "and 9;" should read -- and 9); --. Column 8, line 29, "is" should read -- its --; lines 57 and 58, "dispersed" should read -- dispensed --; line 72, "collector, rings" should read -- collector rings --. Column 9, line 64, "modifiaction" should read -- modification --. Column 11, line 33, "port" should read -- post --. Column 12, line 25, "sheet" should read -- seat --. Column 13, line 3, "therein" should read -- thereon --. Column 14, line 41, "turntable" should read -- turnable --. Column 15, line 35, "unit, coaxially" should read -- unit coaxially --.

Signed and sealed this 2nd day of December 1969.

(SEAL)
Attest:

EDWARD M. FLETCHER, JR.                              WILLIAM E. SCHUYLER, JR.
Attesting Officer                                             Commissioner of Patents